Patented Nov. 5, 1935

2,019,762

UNITED STATES PATENT OFFICE 2,019,762

PROCESS FOR THE MANUFACTURE OF TERTIARY ALCOHOLS

Richard Z. Moravec and William Engs, Berkeley, Calif., assignors to Shell Development Company, San Francisco, Calif., a corporation of Delaware No Drawing. Application February 20, 1933, Serial No. 657,669

13 Claims. (Cl. 260—156)

Our invention relates to a process for the production of tertiary alcohols and more particularly is concerned with their recovery from acid liquor or "fat acid".

It is common practice to absorb tertiary olefines such as isobutylene, the two tertiary amylenes, the tertiary hexylenes and the like in sulfuric acid or other suitable strong acids such as phosphoric acid or strong sulfonic acids of benzene and its homologues. To recover the potential alcoholic content of the acid liquor, it has been customary to neutralize the acidic material and distill the resulting neutral liquid mixture to recover the alcohol. If the material is not neutralized, varying amounts of the alcohol are decomposed to the original olefine depending upon the acidity of the solution, the temperature and the time of contact in the still or column. By using a continuous stripping column it is possible to reduce the losses to about 5%, but it is difficult to eliminate them entirely.

We have observed that tertiary olefines absorbed in acids of the character described do not form tertiary alkyl acid esters, or if such are formed can be regarded as transitory as analyses only disclose the presence of the corresponding alcohols. This is probably due to the fugitive nature of the acid ester or neutral ester, if any is formed, in the presence of a relatively strong polybasic acid and water. It appears that the strong acid acts as a catalyst under absorption conditions and causes the olefine to react directly with water present in the aqueous acid to form the corresponding alcohol. In other words, the number of mols of olefine capable of being absorbed in a strong acid and converted to alcohol is equivalent to the number of mols of water present provided the temperature of absorption is adjusted to the strength of acid i. e. as the strength of acid employed decreases, higher temperatures of absorption should be resorted to.

Be that as it may, we have discovered a means of avoiding decomposition losses by proceeding substantially as follows. We propose to neutralize the acid liquor with gaseous ammonia, ammonia water, anhydrous ammonia or with any suitable basic salt, such as ammonium carbonate, ammonium carbamate, the corresponding alkali-metal compounds, suitable oxides and the like. A quantity of basic agent is employed, sufficient to salt the tertiary alcohol out of the aqueous solution into an insoluble alcoholic phase containing around 85 per cent tertiary alcohol by volume. This alcoholic phase is then separated from the mixture and distilled by any convenient method such as by flash evaporation, distillation at atmospheric or superatmospheric pressure or under a partial vacuum without danger of decomposing the alcohol. The lower phase may be evaporated to recover the salt or salt mixtures, if a plurality of basic agents have been employed.

For example, if ammonia has been used, the operation offers the following definite advantages. (1) The ammonium salt of the strong acid has a definite market value which should at least partially offset the acid charges. (2) When the tertiary alcohol is salted out of the solution, it takes all polymers and tarry matter with it leaving a clean ammonium salt solution. (3) A definite increase in alcohol yield is possible as less than 2 per cent of the total alcohol is lost in the saturated ammonium salt solution. (4) Distillation of only the alcoholic phase reduces the volume of material to be distilled by over 50 percent.

As illustrative only, the following example is cited wherein aqueous sulfuric acid has been employed to absorb tertiary butylene:

|  | C. c. |
|---|---|
| Volume of acid liquor | 6,925 |
| Alcoholic content | 3,655 |

When neutralized with aqua ammonia containing 26% by weight of ammonia, two phases were obtained as follows:

|  | C. c. |
|---|---|
| Alcoholic phase (containing 3,580 c. c. of tertiary butyl alcohol or 98.2% of the total) | 4,160 |
| Lower phase (containing 75 c. c. of alcohol or 1.8% of the total) | 7,580 |

The lower layer was water-white and contained solid ammonium sulfate.

Upon distillation of the alcoholic phase, practically all of the alcohol was recovered. It could then be salted out and/or subjected to azeotropic distillation to recover the substantially anhydrous product.

Similar results are obtained with tertiary amylene, hexylene and the like absorbed in aqueous solutions of strong acids of the character described.

The source of the olefine is not of importance. It may be derived by the decomposition of organic compounds or by the cracking of mineral products such as shale, brown coal, petroleum and its products, by destructive hydrogenation of organic compounds or by the pyrolytic treatment of other natural carbonaceous materials Fractions containing both paraffines and olefines such as obtained by the fractionation of cracked petroleum products, may be used and the acid liquor formed by the selective absorption of the tertiary olefine therefrom. The fraction may predominantly consist of hydrocarbons containing the same number of carbon atoms to the molecule as a mixture of butane, isobutane, butene-1, butene-2, and isobutene or may comprise a mixture consisting of hydrocarbons containing 4 and 5 carbon atoms to the molecule. The invention is not limited to the use of an individual tertiary olefine absorbed in a strong acid but comprises mixtures of olefines as well.

While we have in the foregoing described in some detail the preferred embodiment of our invention and some variants thereof, it will be understood this is only for the purpose of making the invention more clear and that the invention is not to be regarded as limited to the details of operation described, nor is it dependent upon the soundness or accuracy of the theories which we have advanced as to the reasons for the advantageous results attained. On the other hand, the invention is to be regarded as limited only by the terms of the accompanying claims, in which it is our intention to claim all novelty inherent therein as broadly as is possible in view of the prior art.

We claim as our invention:

1. In a process for the manufacture of aliphatic tertiary alcohols from acid liquor obtained by the absorption of a tertiary olefine in an aqueous solution of a polybasic strong acid, the steps of adding sufficient basic agent to the acid liquor to form two phases, separating the alcoholic phase from the non-alcoholic phase and independently treating the former to recover tertiary alcohol therefrom.

2. In a process for the manufacture of aliphatic tertiary alcohols from acid liquor obtained by the absorption of a tertiary olefine in an aqueous solution of a polybasic strong acid, the steps of neutralizing the acid liquor with a basic agent of the class consisting of ammonia and basic salts of ammonia of a concentration sufficient to cause the formation of two phases, separating the alcoholic phase from the non-alcoholic phase and independently treating the former to recover tertiary alcohol therefrom.

3. In a process for the manufacture of aliphatic tertiary alcohols from acid liquor obtained by the absorption of a tertiary olefine in an aqueous solution of a polybasic strong acid, the steps of neutralizing the acid liquor with sufficient ammonia so as to form two phases, separating the alcoholic phase from the non-alcoholic phase and independently treating the former to recover tertiary alcohol therefrom.

4. In a process for the manufacture of aliphatic tertiary alcohol from acid liquor obtained by the absorption of a tertiary olefine in aqueous sulfuric acid, the steps of neutralizing the acid liquor with a sufficient concentration of a basic agent so that two phases are obtained, separating the alcoholic phase from the non-alcoholic phase and independently treating the former to recover tertiary alcohol therefrom.

5. In a process for the manufacture of aliphatic tertiary alcohol from acid liquor obtained by the absorption of a tertiary olefine in aqueous sulfuric acid, the steps of neutralizing the acid liquor with a sufficient concentration of a basic agent of the class consisting of ammonia and basic salts of ammonia so that two phases are obtained, separating the alcoholic phase from the non-alcoholic phase and independently treating the former to recover tertiary alcohol therefrom.

6. In a process for the manufacture of aliphatic tertiary alcohols from acid liquor obtained by the absorption of a tertiary olefine in aqueous sulfuric acid, the steps of neutralizing the acid liquor with sufficient ammonia so that two phases are obtained, separating the alcoholic phase from the non-alcoholic phase and independently treating the former to recover tertiary alcohol therefrom.

7. In a process for the manufacture of tertiary butyl alcohol from acid liquor obtained by the absorption of tertiary butylene in aqueous sulfuric acid, the steps of neutralizing the acid liquor with a sufficient concentration of a basic agent so that two phases are obtained, separating the alcoholic phase from the non-alcoholic phase and independently treating the former to recover tertiary butyl alcohol therefrom.

8. In a process for the manufacture of tertiary butyl alcohol from acid liquor obtained by the absorption of tertiary butylene in aqueous sulfuric acid, the steps of neutralizing the acid liquor with a sufficient concentration of a basic agent of the class consisting of ammonia and basic salts of ammonia so that two phases are obtained, separating the alcoholic phase from the non-alcoholic phase and independently treating the former to recover tertiary butyl alcohol therefrom.

9. In a process for the manufacture of tertiary butyl alcohol from acid liquor obtained by the absorption of tertiary butylene in aqueous sulfuric acid, the steps of neutralizing the acid liquor with sufficient ammonia so that two phases are obtained, separating the alcoholic phase from the non-alcoholic phase and independently treating the former to recover tertiary butyl alcohol therefrom.

10. In a process for the manufacture of aliphatic tertiary alcohols from acid liquor obtained by the absorption of a tertiary olefine in an aqueous solution of a polybasic strong acid, the steps of adding sufficient basic agent to the acid liquor to form two phases, and separating the alcoholic phase from the non-alcoholic phase prior to subjecting the alcoholic phase to a distillation operation.

11. In a process for the manufacture of aliphatic tertiary alcohols from acid liquor obtained by the absorption of a tertiary olefine in aqueous sulfuric acid, the steps of adding sufficient basic agent to the acid liquor to form two phases, and separating the alcoholic phase from the non-alcoholic phase prior to subjecting the alcoholic phase to a distillation operation.

12. In a process for the manufacture of tertiary butyl alcohol from acid liquor obtained by the absorption of tertiary butylene in aqueous sulfuric acid, the steps of adding sufficient basic agent to the acid liquor to form two phases, and separating the alcoholic phase from the non-alcoholic phase prior to subjecting the alcoholic phase to a distillation operation.

13. In a process for the manufacture of aliphatic tertiary alcohols from acid liquor obtained by the absorption of a tertiary olefine in an aqueous solution of a polybasic strong acid, the steps of neutralizing the acid liquor with a sufficient basic agent so as to form two phases, and separating the alcoholic phase from the non-alcoholic phase prior to subjecting the alcoholic phase to a distillation operation.

RICHARD Z. MORAVEC.
WILLIAM ENGS.